UNITED STATES PATENT OFFICE.

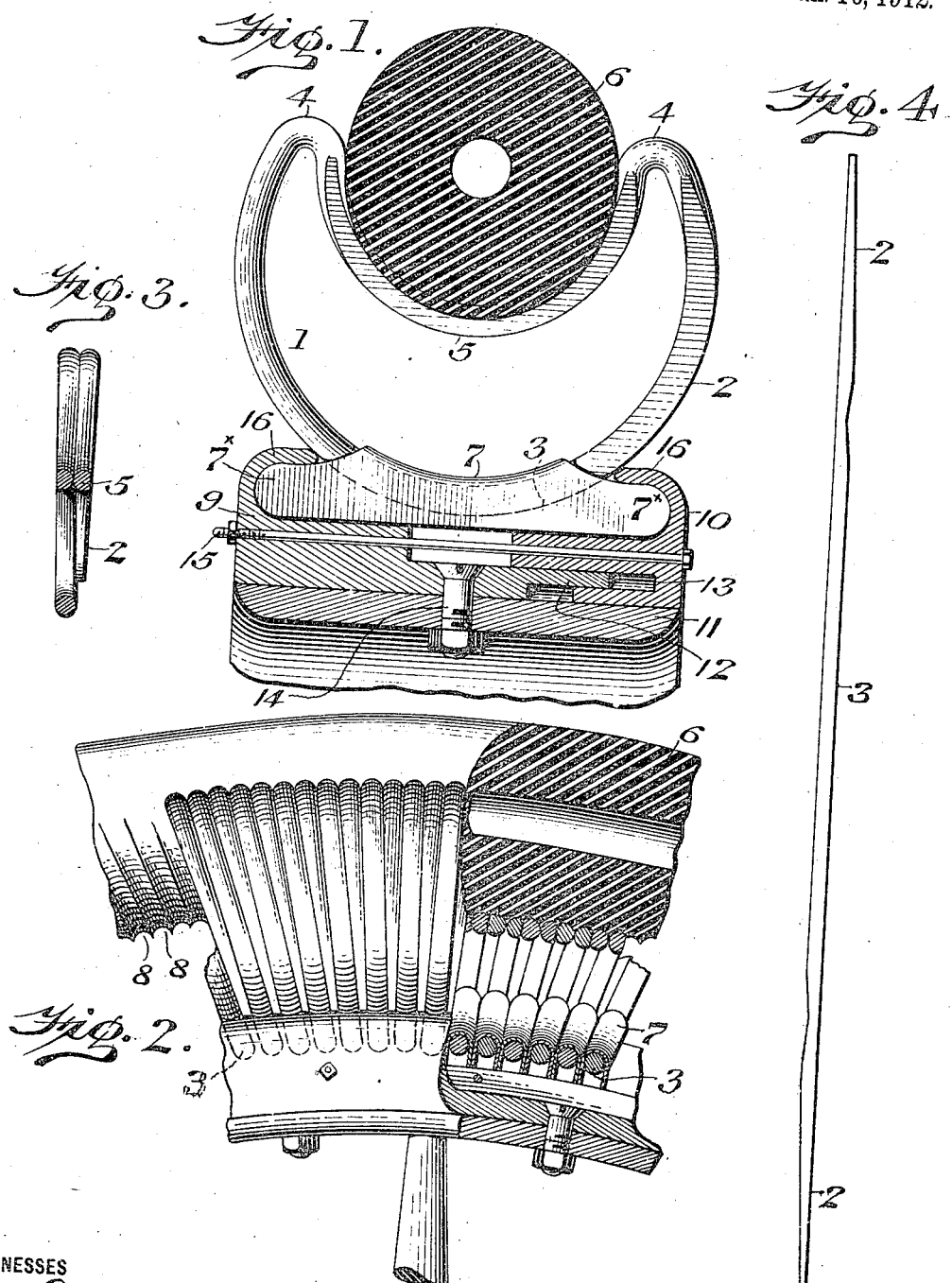

BENJAMIN F. LARE, OF PHILADELPHIA, PENNSYLVANIA.

VEHICLE-TIRE.

1,015,037.

Specification of Letters Patent.   Patented Jan. 16, 1912.

Application filed December 16, 1910.   Serial No. 597,631.

*To all whom it may concern:*

Be it known that I, BENJAMIN F. LARE, a citizen of the United States, residing in the city and county of Philadelphia, State of Pennsylvania, have invented a new and useful Vehicle-Tire, of which the following is a specification.

My invention relates to a vehicle tire structure and more particularly to a spring tire for automobiles and other vehicles and has for an object to provide a tire which is not only puncture proof but which embodies the resiliency necessary to carry out the function of a device of this character.

It consists of a tire formed of a plurality of convolutions of suitable material to give the desired flexibility and resiliency and which convolutions are provided with seats for a suitable tread member, with removable means embracing a suitable portion of said convolutions and clamping means engaging said removable means for holding the tire in position.

It further consists of a novel structure of a tread member formed of suitable resilient material which is adapted to be situated in the seat or receiving means formed in the convolutions, said tread member being provided with means for preventing creeping or movement thereof.

It further consists of other novel features of construction, all as will be hereinafter fully set forth.

For the purpose of illustrating my invention I have shown, in the accompanying drawings, structures embodying the principle of my invention and which will operate successfully in practice, giving satisfactory and reliable results, but I desire it understood that the arrangement of the parts may be varied, other instrumentalities may be employed and changes made in the construction and I do not therefore desire to be limited to the arrangement as herein shown and described but desire to make such changes as may come within the scope of my invention.

Figure 1 represents a sectional view of a portion of the tire embodying my invention, showing one of the convolutions in elevation. Fig. 2 represents a partial side elevation and partial sectional view of a portion of the tire. Fig. 3 represents a sectional view on a smaller scale, of one of the convolutions. Fig. 4 represents on a smaller scale, a blank from which one of the convolutions may be formed.

Similar numerals of reference indicate corresponding parts in the figures.

Referring to the drawings:—1 designates one section of my novel tire structure, the same comprising a convolution of spring or other suitable material, the ends 2 of which pass each other and extend on each side downwardly, preferably on a curve, having the same radius as the main portion of the convolution and terminating at a point adjacent the rim engaging surface or portion 3 of the convolution. At a suitable point at each side of the convolution as at 4, the material is depressed being curved or bent downwardly, forming a seat or socket 5 in each convolution at the outer portion thereof, said seat or recess being adapted to receive a suitably formed tread member 6, of any suitable material, in the present instance the same being shown as formed of rubber, substantially solid and thus puncture proof, although any suitable form of tread may be employed. As stated, the end portions 2 of the convolution terminate adjacent the rim engaging portion 3 of the convolution so that as will be noticed more particularly from Figs. 2 and 3, each convolution has two laterally disposed portions of the material at the points 4 and at the seat or socket formed in these convolutions, while a single portion of the material only, forms or serves as the rim engaging surface of a convolution. I preferably desire to taper the end portions 2, beginning at a suitable point and I also taper or flatten the exterior sides of the depressed portions of the material which forms the seats or sockets, in order that the planes of the edges of each convolution will be oppositely inclined to a radial plane, as will be apparent from Fig. 3. A further function of the ends 2 of each convolution is to form a stop or limiting means to prevent movement of a section by engaging with the removable engaging means, in the present instance shown as a clip 7 which is preferably formed of suitable material and is adapted to embrace the single or rim engaging portion of the convolution between the ends 2. This clip 7 preferably provides a body portion substantially U-shaped in order to suitably embrace the said rim engaging portion of the convolution and each clip being provided, preferably integral therewith, with ears 7× projecting outwardly from each side of a convolution and which serve as engaging means with which a suitable clamp member coöperates to secure the clip and the convolution, and so the tire section, to a rim construction.

It will be noted with respect to Figs. 1 and 2 that for each section or convolution of the tire, one of these clips is provided, whereby each section will be firmly and positively held in position to form a complete unitary tire structure when secured in place upon a suitable rim. It will be noted that the recess or seat provided by the convolutions is of suitable extent in order that the portions 4 of each convolution will extend a suitable distance above the center of the tread member 6, which latter will be of such size in order that it will be necessary to force the same over one of the points after which the tread member will contact into position in the seat or socket formed in the sections and will firmly engage therewith since the same is preferably smaller than the circumference of the seats. The inner surface of the tread member 6 is preferably formed with corrugations or recesses 8, see Fig. 2, in order that each corrugation or recess will be adapted to receive a suitable portion of the material forming the convolutions and it being noted that by these means some of the material of the tread will be positioned between adjacent portions of the material forming the seat or recess in a convolution to prevent creeping or movement of the tread 6. Any suitable means for securing the convolutions in position may be employed and in the present construction I have shown the tire secured to the rim of a vehicle wheel by means of a plurality of sections 9 and 10 which are adapted to be suitably secured to the felly 11 of the vehicle wheel. These rim sections in the present instance consist of annular rings passing circumferentially around the felly 11, one of which is provided with a tongue 12 while the opposite section is provided with a slot 13 adapted to receive said tongue, whereby when the two sections are in position upon the felly 11, these members provide an interfitting connection between the sections which forms a substantial and strong means of preventing radial movement of the said sections. In the present instance I have shown a bolt 14, any suitable number of which may be employed around the felly 11 for securing the section 9, in the present instance, thereto and I have shown a rod 15 passing through the sections for locking the same together, it being noted that each section is provided with a suitable lip 16 adapted to engage with extending ears on the convolutions to secure the same to the rim or the felly of the wheel.

It will be noted that the ends 2 are so formed and positioned in order to provide for the thicknesses of the clips in such a manner that when in place upon the rim or felly of the wheel, the planes of the edges of each convolution will be oppositely inclined to a radial plane in order that the convolutions will form a substantially continuous surface, as will be more particularly seen in Fig. 2.

Having thus described my invention, what I claim as new and desire to secure by Letters Patent, is:—

1. In a tire, a plurality of convolutions of suitable material, each convolution being depressed at the outer portion thereof to form a seat, the ends of each convolution passing each other and extending toward the rim on each side of said seat, and a tread member held in said seat.

2. In a tire, a plurality of convolutions of suitable material, each convolution being depressed at the outer portion thereof to form a seat, the ends of a convolution passing each other, and extending on each side of the seat, the outer edges of said depressed portions and the said ends being tapered, and a tread member held in said seat.

3. A spring section for a tire consisting of a coil having a tread supporting portion and a rim engaging portion and formed of a convolution of spring material depressed at the tread supporting portion to form a seat, the ends of the section extending upon opposite sides of the seat, whereby two portions of the material form the seat of the section.

BENJAMIN F. LARE.

Witnesses:
C. D. McVay,
F. A. Newton.